United States Patent [19]

Graham

[11] 4,411,004
[45] Oct. 18, 1983

[54] INDUCTIVELY COUPLED SENSING CIRCUIT AND PRIORITY SYSTEM

[75] Inventor: Martin H. Graham, Berkeley, Calif.

[73] Assignee: Rolm Corporation, Santa Clara, Calif.

[21] Appl. No.: 311,050

[22] Filed: Oct. 13, 1981

Related U.S. Application Data

[63] Continuation-in-part of Ser. No. 163,573, Jun. 27, 1980, Pat. No. 4,320,520.

[51] Int. Cl.[3] .............................................. H04B 3/00
[52] U.S. Cl. .......................................... 375/36; 375/8;
370/78; 370/84; 333/109; 340/825.51;
340/825.43
[58] Field of Search ............... 375/36, 8; 370/84, 118,
370/92, 72, 78, 85, 93; 358/133-138, 173;
333/109, 112, 119, 131; 340/825.42, 825.43,
825.52, 825.59, 825.51, 825.5, 345, 346

[56] References Cited

U.S. PATENT DOCUMENTS 3,550,042 12/1970 Werlau ................................ 333/112
3,619,504 11/1971 De Veer ............................... 333/109
3,851,098 11/1974 Pingault ................................ 375/36

Primary Examiner—Donnie Lee Crosland
Attorney, Agent, or Firm—Blakely, Sokoloff, Taylor & Zafman

[57] ABSTRACT

An inductively coupled sensing circuit for use on a common cable communications system is disclosed. When used in conjunction with transceivers on a common cable system, the circuit is capable of both detecting signals and determining the direction of any colliding signals while the transceiver is operating. An inherently balanced bridge is created by coupling the transmitter lead between two elements of the sensing circuit. Each receiver is provided with means for determining the polarity of the sensing circuit, thereby determining the direction of any incoming signal. The use of this sensing circuit in a common cable system allows a hierarchy among cable users to be created thereby optimizing cable use. A left or right priority is determined by the polarity of an end signal transmitted at the end of each transmission.

14 Claims, 10 Drawing Figures

INDUCTIVELY COUPLED SENSING CIRCUIT AND PRIORITY SYSTEM (This application is a continuation-in-part of copending application Ser. No. 163,573 filed June 27, 1980, now U.S. Pat. No. 4,320,520, entitled: "TRANSMITTER/RECEIVER FOR USE ON A COMMON CABLE COMMUNICATIONS SYSTEM SUCH AS "ETHERNET"

BACKGROUND OF THE INVENTION

1. Field of the Invention

The invention relates to communication systems, particularly systems where a plurality of receivers and transmitters are coupled to a common bus or cable.

2. Prior Art

In some communications systems, it is desirable to couple many transmitters and receivers to a common cable or bus. For example, a single coaxial cable may be routed to several buildings in a complex, with several transmitters and receivers (or transceivers) at each building coupled to the cable. Data is then transmitted from a transmitter to a selected (addressed) receiver or group of receivers. The rate at which data is transferred is limited by the bandwidth of the entire cable. A data rate of 3 megabits per second for a mile of cable is typical in these systems.

In common cable systems of the type described where long cable lengths are used, the delay time for a signal to travel end to end along the cable can become significant. For example, referring to FIG. 10, transmitter A begins to transmit at time $t_0$. Before A's signal can reach transmitter B, B not sensing any cable use also begins to transmit at time $t_1$. A collision of signals results, and thus some collision avoidance mechanism is needed on the cable to avoid chaos.

Collision avoidance systems to date, such as used in "Ethernet", (U.S. Pat. No. 4,063,220) have relied on circuitry which after identifying a collision aborts the data transmission and waits a random time before retransmitting. The retransmit delay time is weighted given the number of collisions detected. This system is simply based on the premise that eventually one transmitter will gain control of the cable and complete its message. The longer the cable and further apart each respective transmitter and receiver is, the more likely multiple collisions will occur and the longer it takes for any transmitting unit to obtain control over the cable.

The Ethernet collision detector circuit relies on an exclusive-Or gate, the inputs of which are connected to the transmitter input and receiver output. By inserting the appropriate time delay on the transmitter input of the gate, and matching the delay time to the switching delays of the transmitter and receiver, the exclusive-Or gate will receive nearly identical signals and the output will thus remain low. If signals other than those originating from the particular transmitter are received, the gate will no longer receive the same signals and the gate output will be high, thereby indicating a collision. Other circuits associated with an Ethernet system are described in this Patent in order to more fully identify the nature of the present invention.

Thus, in systems such as Ethernet, whether or not any one transmitter will acquire the use of the cable is based essentially on chance. It is not possible to assign to such a system a transmission hierarchy, giving cetain transceivers priority, and until the present invention was developed it was not possible for receivers using a common cable to determine the direction from which a colliding signal arose.

As will be disclosed below, the present invention provides a means whereby each transceiver can detect both the presence and direction of an interfering signal, even while the transceiver is transmitting. In addition, since the direction of the conflicting transmitter can be determined, a left or right hierarchy can be created to give certain units priority in transmitting.

SUMMARY OF THE INVENTION

The present invention is most advantageously used in a communications system where a plurality of transceivers are spaced-apart along a common cable. Each transceiver is provided with a sensing circuit which is inductively coupled to the common cable for receiving signals travelling along the cable. An inherently balanced bridge is created by coupling the transmitter lead between two elements of the sensing circuit, thereby allowing a transceiver to sense interfering signals even while transmitting. Each transceiver is provided with means for determining the polarity of the sensing circuit, and logic circuitry which identifies the direction of any incoming signal based on the signal's polarity. An order of priority to the left or right can be determined by an end priority signal, transmitted at a data rate such that it can be received by all transceivers using the cable. Thus, any transceiver which after beginning to transmit detects a signal from a higher priority unit, will abort and delay a restart until an end signal is detected. If the particular transceiver has priority, the transmitter is instructed to retransmit its data along the cable.

Each of the transmitters may be adapted to transmit data at multiple data rates which includes a first (lowest) data rate and a plurality of other rates. The lowest data rate is sufficiently low to permit transmission between the furthest apart of the transmitters and receivers. Each of the transmitters includes data rate selection means for selecting one of the plurality of other data rates as a function of the available bandwidth along the cable between the transmitter which is transmitting and the receiver for which the transmission is intended. Each of the receivers is adaptable for receiving data at multiple rates and is able to adjust its reception rate. A header is first transmitted at the lowest data rate to alert the selected receiver and to provide it with a code representing the data rate at which data will be transmitted to it.

DETAILED DESCRIPTION OF THE INVENTION

An improvement to a communications system which uses a plurality of transmitters and receivers on a common cable such as in an Ethernet system is described. In the following description for purposes of explanation, specific numbers, etc., are set forth in order to provide a thorough understanding of the present invention. However, it will be obvious to one skilled in the art that the present invention may be practiced without these specific details. In other instances, well-known circuits are shown in block diagram in order not to obscure the present invention in unnecessary detail.

Figure 1:
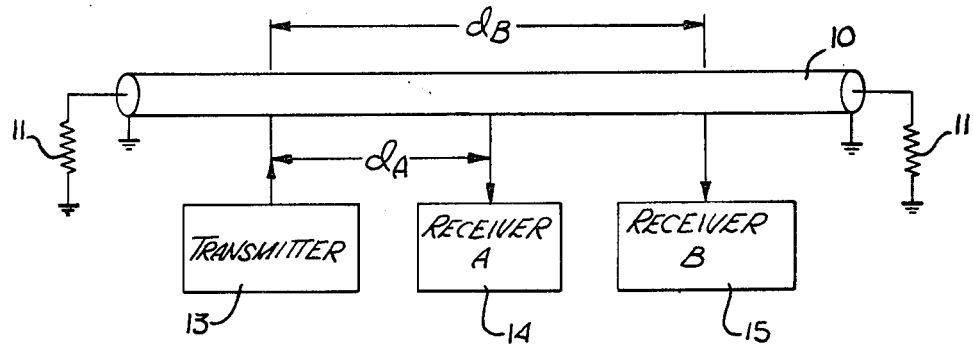
FIG. 1 is a block diagram illustrating a communications system wherein a transmitter and two receivers are coupled to a common cable.

Referring now to FIG. 1, a cable 10 is shown which is terminated in terminators shown as resistors 11. For purposes of discussion, a single transmsitter 13 is shown coupled to this cable, along with two spaced-apart receivers, receiver A (14) and receiver B (15). The transmitter is separated from the receiver A by a distance $d_A$, while receiver B is separated from transmitter 13 by a longer distance, $d_B$.

Figure 2:
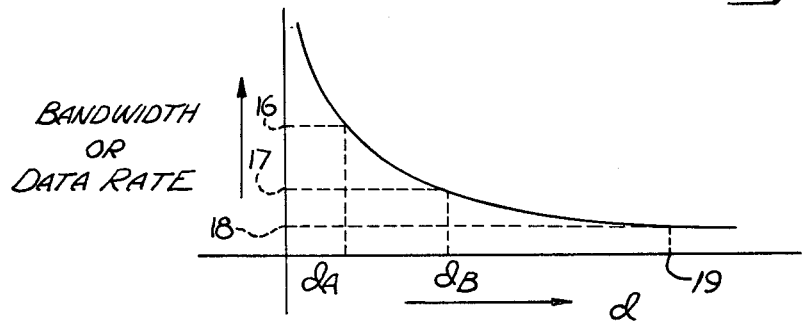
FIG. 2 is a graph illustrating bandwidth versus cable length for the communications system of FIG. 1.

In the graph of FIG. 2, distance along the cable 10 of FIG. 1 as measured from the transmitter 13, is plotted along the abscissa. The bandwidth along the cable from the transmitter 13 is plotted along the ordinate. The rate at which data can be transmitted along the cable is a function of the bandwidth of the cable. As is apparent from FIG. 2, the bandwidth available between a transmitter and a receiver separated by only a short distance along the cable, is greater than the available bandwidth between the transmitter and a receiver further away.

Relating FIG. 1 to FIG. 2, the available bandwidths between transmitter 13 and receivers A and B are shown in FIG. 2 at points 16 and 17, respectively. As is apparent, the bandwidth between the transmitter and receiver A is substantially greater than the bandwidth between the transmitter and receiver B. In a typical prior art system, the data rate is limited by the bandwidth available between the furthest apart transmitter and receiver. By way of example, in FIG. 2, if point 19 represents the furthest distance between a transmitter and receiver on cable 10, the bandwidth for the entire system would be limited by the bandwidth at point 18.

The present invention provides better utilization of the cable 10 by transmitting data at various rates. The rate is determined by the distance between the transmitting transmitter and the receiving receiver. Again referring to FIG. 2, if transmitter 13 is communicating with receiver A, then a data rate corresponding to point 16 is used, whereas if the transmitter is communicating with receiver B, a lower data rate (point 17) is used. In a typical application where a plurality of transmitters and receivers are coupled to a single cable, it is advantageous for the transmitters to transmit at a plurality of different rates, and also for the receivers to receive at a plurality of different rates.

With the present invention, when a transmitter begins to transmit, it first transmits a message (hereinafter referred to as a "header") at a data rate sufficiently slow to allow reception by the most remotely located transmitter and receiver on the cable. All receivers receive the header and from it, determine the identity of the receiver or receivers to receive data and the data rate at which the data will be transmitted. The transmitter has stored in memory the data rate which is to be used between itself and each of the receivers. The various data rates are determined as a function of the available bandwidth between the transmitters and each of the receivers. At the end of each data message, the transmitter transmits a distinctive end signal at a data rate such that it is received by all receivers on the cable. This message notifies the on line transceivers that the cable is now clear for use. In addition, as will be discussed below with reference to FIG. 7, each end signal can include a priority code such that a hierarchy is created among all cable users. It will be appreciated by one skilled in the art that where a specific data encoding scheme is used, such as Manchester Coding, only an alert need be transmitted at the lowest data rate in order to notify all transceivers that the cable is in use. Both the address of the receiver and the date rate can be determined by the clock and data characteristics of the particular message.

Figure 3:
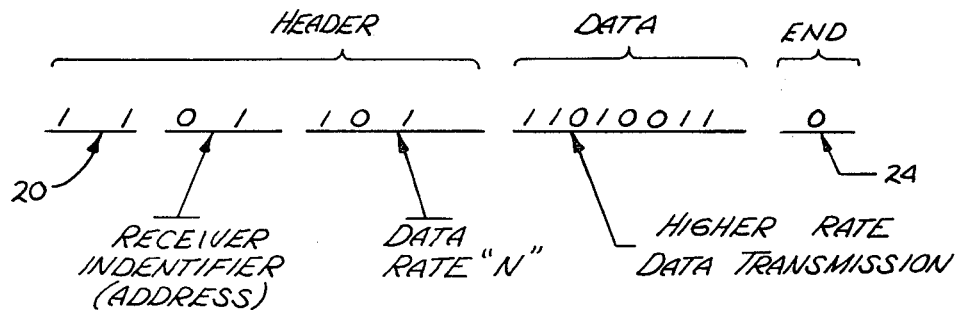
FIG. 3 is an illustration of a digital message used with the present invention.

Referring to FIG. 3, a typical message format for transmission between a transmitter and receivers is shown. The segment 20 represents an initiating signal to alert the receivers to the fact that a transmission is to begin. Following this, the transmitter transmits the identity (address) of the receiver or receivers for which the transmission is intended. The length of this address will depend, of course, upon the number of receivers along a given cable. A 2-bit code is shown in FIG. 3 for purposes of explanation. With this code, one of four receivers may be addressed. In some applications, it may be desirable to have more address codes available than receivers so that some address codes can be used to alert more than a single receiver. This is useful where a transmitter is to simultaneously transmit to more than a single receiver.

Following the address, the header concludes with a code representing the data rate. As will be seen in the first embodiment, this digital code represents a number "N", which is used as a divisor. After the header, the data is then transmitted. As shown in FIG. 3, for purposes of illustration, the data is shown transmitted at twice the rate of the header. The commonly employed message acknowledgements, etc., known in the prior art are not shown in FIG. 3, not discussed elsewhere in this application.

Following each data transmission is an end signal 24. In order to allow a transceiver to distinguish between the beginning and end of a transmission, the end signal 24 is of shorter duration than the alert segment 20. Although FIG. 3 shows end 24 as a 1-bit code, it will be noted that any length is sufficient as long as the length of the end signal is less than that of the alert 20. As will be discussed below the content of end segment 24 can set forth a left or right hierarchy among cable users.

Figure 4:
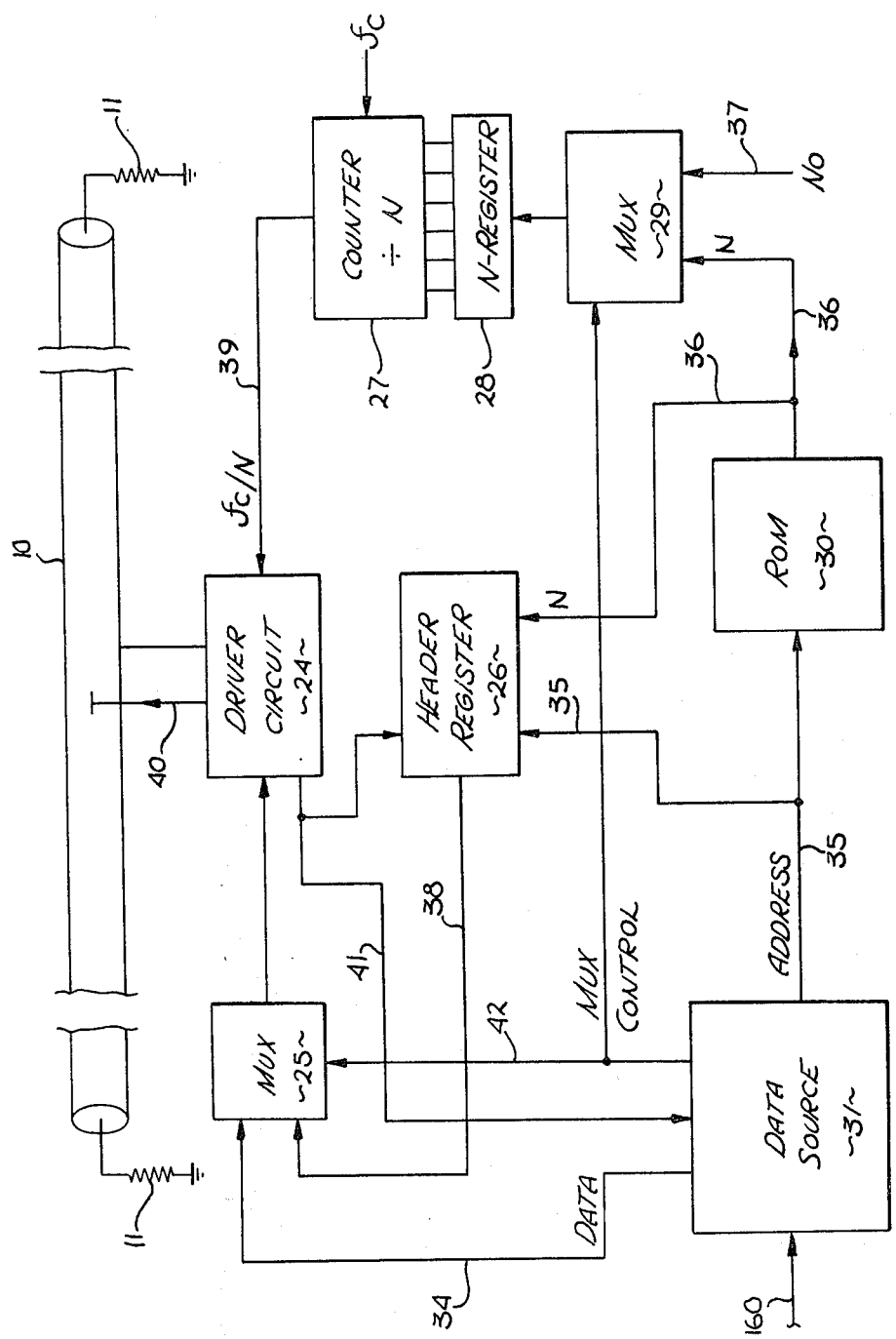
FIG. 4 is a block diagram of a transmitter in accordance with the present invention.

Referring now to FIG. 4, a portion of a common cable 10 is illustrated, the ends of which are again terminated in terminators such as resistors 11. It is assumed that a plurality of other transmitters and a plurality of receivers are also coupled to the coaxial cable 10. The transmitter shown in FIG. 4 (which may be part of a transceiver) is coupled to the cable 10 through line 40; serialized data preceded by the header as shown in FIG. 3 is communicated to the cable 10 on line 40.

The transmitter of FIG. 4 may be used with a plurality of data sources such as computers, data entry terminals, memories, etc. For purposes of discussion, a data source 31 is illustrated which provides data on line 34 and an address signal on line 35 which identifies the receiver or receivers for which the data is intended. It is assumed that the data source 31 provides the address in parallel form on line 35 (a multiple path line) and data in serial form on line 34. The data source 31 also provides a control signal to indicate when data is transmitted from the data source 31. Other well-known timing signals and control signals associated with data sources are not illustrated in FIG. 4.

The address on line 35 is coupled to a "header" register 26 and to a read-only memory (ROM) 30. The ROM 30 is programmed to provide a number "N" for each address signal it receives from the data source 31. The number "N" is communicated to the multiplexer 29 on line 36 and to the register 26. The multiplexer 29 is also coupled to receive a constant digital number $N_o$ on line 37 and selects between either the digital number on line 36 or the digital number $N_o$. The output of the multiplexer 29 is coupled to a register 28 which, in turn, is coupled to a counter 27. The counter 27 divides the frequency $f_c$ by the number (N) in register 28. Thus, the output of the counter 27, line 39 is shown as $f_c/N$. The $f_c$ signal is generated by a crystal controlled oscillator and each of the transmitters and receivers include such an oscillator.

The register 26 transmits the header shown in FIG. 2 in serial form on line 38. The multiplexer 25 selects either the header from line 38 or the data from line 34. The output of the multiplexer 25 is coupled to a cable driver circuit 24.

The driver circuit 24 which may be an ordinary clocked driving circuit, couples the signal from the multiplexer 25 onto the cable 10 at the rate of a clocking signals received on line 39, $f_c/N$. This circuit provides a timing signal on line 41 to the data source 31 and register 26 to control the header and data flow rates.

Assume for sake of discussion that $f_c$ is equal to 60 MHz. Further assume that the available bandwidth on the cable 10 between the furthest apart transmitter and receiver is 3 MHz ($N_o=20$). Assume now that it is necessary to communicate data from the data source 31 to a receiver A along the the cable 10, and that the available bandwidth between the transmitter and receiver A is 10 MHz. The ROM 30 is programmed such that the address for receiver A on line 35 provides N=6 on line 36. The digital number representing N=6 is then communicated both to the multiplexer 29 and to the register 26. Initially, the multiplexer 29 selects $N_o=20$ and the N register 28 is set $N_o=20$. During the transmission of the header, the multiplexer 25 selects line 38 and the signal on line 39 is 3 MHz. The header is then transmitted onto the cable from the register 26 through the multiplexer 25 and driver circuit at the 3 MHz rate. Receiver A, upon receiving the header, adjusts its reception to the 10 MHz rate since it also receives N=6. After the header has been transmitted, the data source 31 provides a control signal on line 42 to both the multiplexers 25 and 29. Multiplexer 25 then selects the data on line 34. The multiplexer 29 selects the output of the ROM 30 and the N register 28 is set to N=6. When this occurs, the 60 MHz signal $f_c$ is divided by 6 to provide the 10 MHz clocking signal on line 39. Then the data is transmitted onto the cable 10 through line 34 at the 10 MHz rate.

Each of the transmitters on the cable 10 has its own ROM 30 which is programmed with a plurality of numbers "N", each of which is determined by the available bandwidth between that particular transmitter and each of the receivers on the cable. The number $N_o$ is the same for all of the transmitters on the cable. This number is changed, for example, when the cable 10 is lengthened or shortened.

Figure 5:
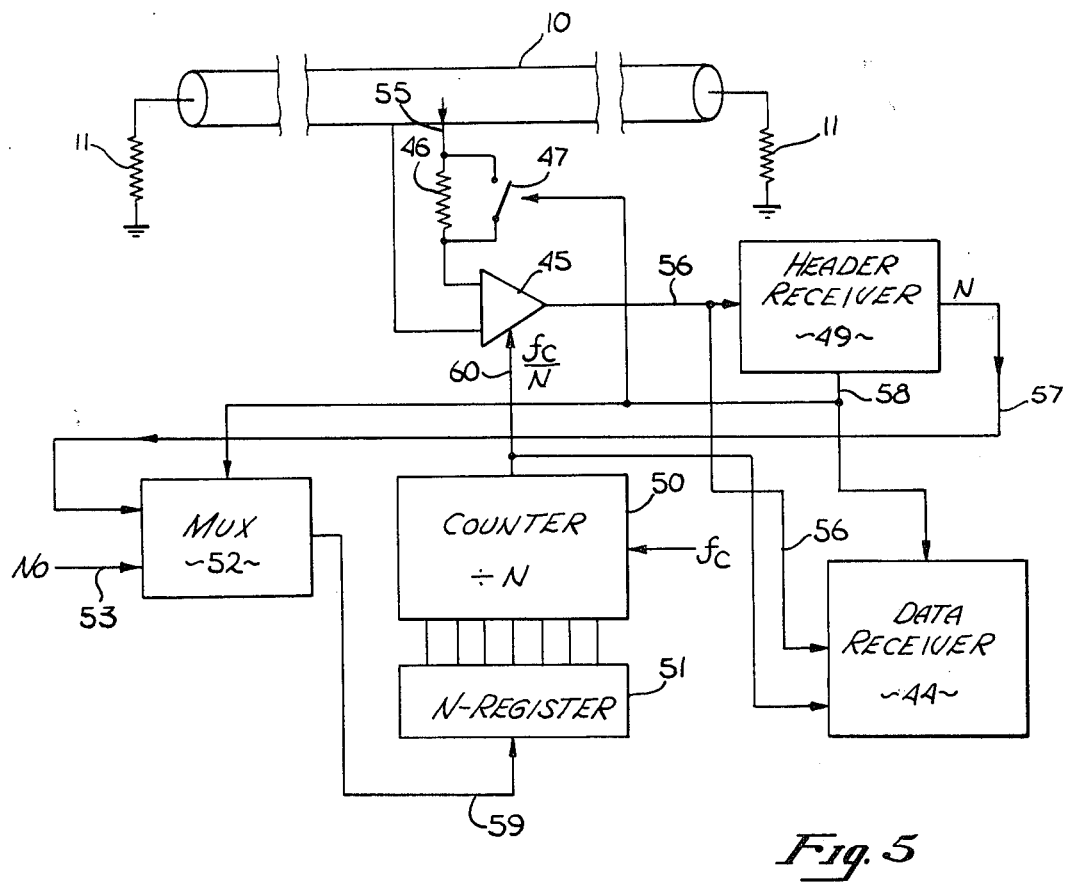
FIG. 5 is a block diagram of a receiver configuration.

Referring now to FIG. 5, a receiver is shown coupled to the cable 10. An emitter-coupled logic amplifier 45 receives the signal from the cable 10 through line 55 and resistor 46. A shunting switch 47 is coupled across the resistor 46; this switch is controlled by the signal on line 60. This signal is represented by $f_c/N$. The output of the amplifier 45 is coupled both to a header receiver 49 and to a data receiver 44.

The data receiver 44 may be any one of a plurality of digital processors, memories, etc., and as is often the case, the data receiver 44 is an integral part of a data source 31, with the receiver of FIG. 5 being combined with the transmitter of FIG. 4 in a transceiver configuration.

The header receiver 49 includes a register for receiving the header. The address portion of the header is compared with the address of the receiver to determine if the receiver is intended to receive data within receiver 44. If the receiver is addressed, then a signal is coupled on line 58 to the data receiver 44, multiplexer 52 and the switch 47. The receiver 49 also receives the number "N" and communicates this number on line 57 to the multiplexer 52. The output of the multiplexer 52 which is either the number "N" from the receiver 49 or $N_o$ from line 53 is coupled to the register 51. Again, as in the case of the transmitter, the receiver includes a counter which divides by N. Counter 50 also receives $f_c$ and provides a clocking signal, $f_c/N$ (or a signal representative of this frequency) on line 60 to the amplifier 45. In the case of a transceiver, header receiver 49 also identifies an end signal and via control line 261 informs transmitter data source 31 (see FIG. 4) that the cable is clear for transmission.

Assume for purposes of discussion that a header is transmitted on the cable 10. During this transmission, the multiplexer 52 is selecting line 53. Thus, $N_o$ or the number 20 (continuing the above example) is in register 51. The counter 50 divides 60 MHz by 20 and the amplifier 45 is clocked to receive signals at the 3 MHz rate. When the header is received, it is communicated through the amplifier 45 into the receiver 49. If the receiver of FIG. 5 is selected to receive data, then the switch 47 is closed, the receiver 44 is alerted and the multiplexer 52 selects "N" from line 57 and couples it to the register 51. The counter 50 then provides, for example, a 10 MHz signal and the amplifier 45 then receives data at the rate at which it is transmitted.

The purpose of the switch 47 is to decrease the input impedance of the selected (addressed) receiver. This increases the power from the cable delivered to the addressed receiver. Note that the other receivers have equivalent switches which remain open, and thus, only the selected receiver presents a lower input impedance. This improves the signal-to-noise ratio and enables transmission at a higher rate.

Figure 6:
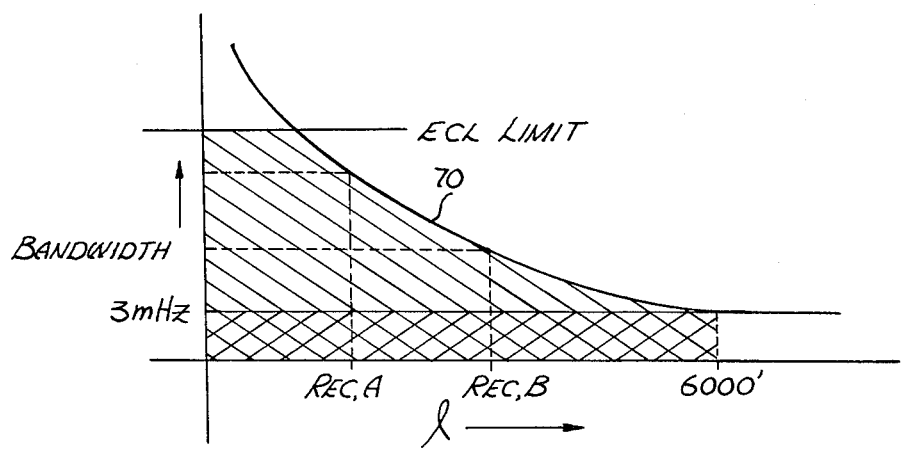
FIG. 6 is a graph used to illustrate the increased data rate obtained through use of the present invention.

Referring now to FIG. 6, the curve 70 illustrates available bandwidth versus distance (1) along a cable such as cable 10. The curve 70 (as does the graph of FIG. 2) illustrates that very high bandwidths are available for short distances and that the bandwidth drops off to a lower limit of approximately 3 MHz at 6,000 feet. The effective available bandwidth for short distances when the receivers are considered, is limited by the upper frequency limit of the receivers. The line "ECL limit" is used to illustrate the upper limit of bandwidth when ECL receiver circuits are used.

The area between the abscissa and the 3 MHz line represents the bandwidth-length product used in prior art systems. The area below the ECL limit and bounded by curve 70 represents the bandwidth-length product available with the present invention. The ratio of these areas is the improvement factor obtained through use of the present invention. As may readily be seen, in a typical application, an improvement of 3 to 4, or more is easily obtained. Thus, substantially more data may be transmitted on a given cable. Transmitting data at a higher rate also reduces the probability of interference, and provides a further overall improvement in an Ethernet network.

In the above examples, it has been assumed that the distances along the cable between each of the transmitters and receivers is known. It is these distances which permit the determination of the available bandwidth and the calculation of "N". In some cases, these distances are not known, or may not remain constant. For example, where transmitters or receivers are disconnected from the cable and reconnected at a different point along the cable, then the data stored within ROM 30 must be updated. In this situation, the transmitter may determine the highest possible transmission rate between itself and any given receiver. This is done by transmitting first at the highest possible rate and waiting for an acknowledgement. If no acknowledgement is received, or if the acknowledgement indicates that the data was not correctly received, then the transmitter continually steps down its transmission rate until an acknowledgement is received. It is assumed that the highest rate at which data is received by a receiver can be again used and the transmitter can store the "N" in a memory. This number can be updated periodically, or any time a correct acknowledgement is not received from a particular receiver.

Figure 7:
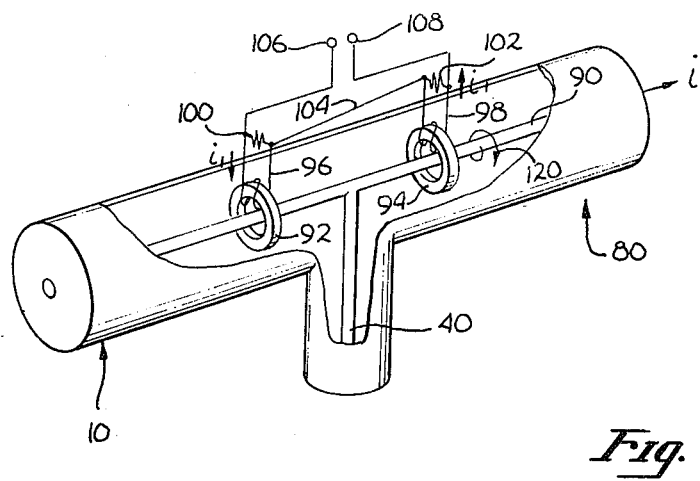
FIG. 7 is a schematic illustration of an inductively coupled sensing circuit.

Thus, an apparatus has been described for use on transmitters and receivers which are coupled to a common cable. The apparatus permits transmission between a transmitter and receivers on this cable at the highest possible rate as opposed to transmitting at a lowest end-to-end rate. The header provides the receiver with a signal, permitting the receiver to adjust its reception rate to the rate at which it will receive data. Referring to FIG. 7, an inductively coupled sensing circuit is disclosed which allows transceivers coupled to a common cable to detect interfering signals, even while the transceiver is transmitting. In addition to receiving signals travelling along the cable, the architecture of the circuit is such that the direction of a colliding signal can be determined. As will be discussed, a hierarchy can be defined such that transceivers have priority in obtaining control over cable use. It will be noted that since many of the components of the transceiver system which will be disclosed correspond to those previously described in FIGS. 4 and 5, unless some modification exists in a particular component, similar numerals will be used to designate the transceiver configuration.

With reference to FIG. 7, a sensing circuit designated generally at 80 is disclosed. The circuit 80 is inductively coupled to the central conductor 90 of cable 10. The circuit 80 includes at least two ferromagnetic cores 92 and 94 through which central conductor 90 passes. The shape of cores 92 and 94 are not critical where a high coefficient of coupling exists, but as shown in FIG. 7, the preferred shape is that of a toroid. Windings 96 and 98 are disposed around cores 92 and 94 respectively, with approximately 30 being a sufficient number of turns per core to achieve the desired operation of the invention. Resistors 100 and 102, being of equal impedance, are connected across each end of windings 96 and 98 respectively, the windings being connected by line 104 as illustrated in FIG. 7. As depicted, lines 106 and 108 are connected to opposite ends of windings 96 and 98, such that the windings are thereby connected in series. Transmitter lead 40 (See FIG. 4 for reference) is coupled to central conductor 90, such that the transmitter lead is spaced between cores 92 and 94. As will be discussed below, the placement of transmitter lead 40 between the cores creates a balanced bridge for signals transmitted via lead 40, thereby allowing a transceiver to detect signals on cable 10 even when the transmitter circuit as disclosed in FIG. 4 is transmitting.

Figure 8:
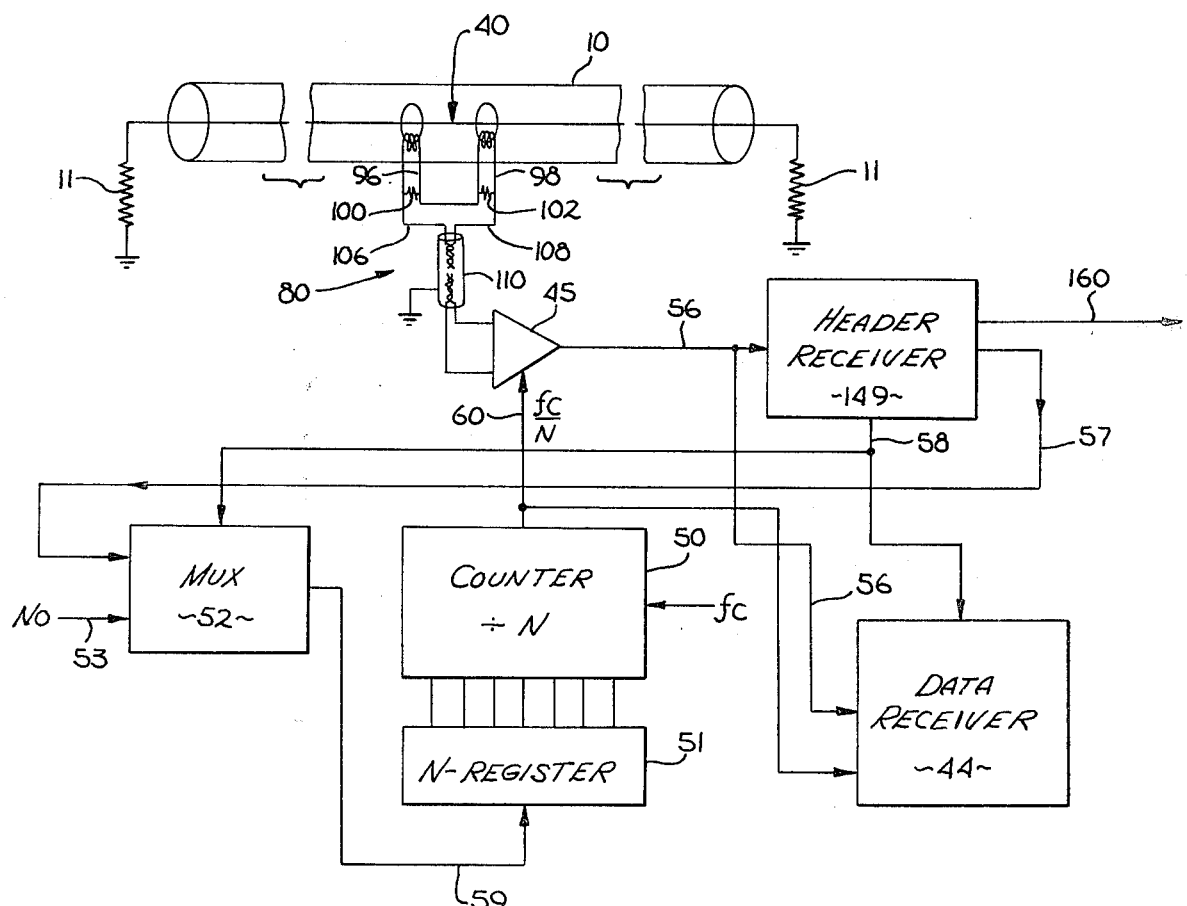
FIG. 8 is a block diagram of a receiver including the inductively coupled sensing circuit of FIG. 7.

Referring now to FIG. 8, the sensing circuit 80 is connected to a receiver circuit which in the presently preferred embodiment includes emitter-coupled logic (ECL) amplifier 45. In practice, the preferred type of cable coupling would be that of a twisted pair with an outer grounded shield 110. It will be noted that the receiver as depicted in FIG. 8 is essentially the same as that disclosed and previously described with reference to FIG. 5.

In addition to incorporating all of the features of header 49 as disclosed in FIG. 5, header 149 further includes a polarity detector and a precedence register. Header 149 also includes a control line 160 which is coupled to data source 31 (See FIG. 4) thereby allowing communication between the two devices and forming a transceiver configuration. Referring to FIG. 7, in operation, sensing circuit 80 in combination with cable 10 forms a transformer circuit, with the inner conductor 90 and outer shield 92 constituting the primary winding, and windings 96 and 98 forming the secondary coil. Signals i passing through central conductor 90 create a magnetic field 120, the direction of which is a function of the direction of the signal i. The magnetic field 120 induces a current $i_1$, in lines 106 and 108, the direction of the current being a function of the direction of the signal i. The operation of transformers are well-known to those skilled in the art and will not be discussed in any further depth. However, the structure of the present invention as disclosed provides a sensing circuit which heretofore was not known in the art.

Assume for purposes of discussion that no transmission of data is occurring via lead 40 in FIG. 8. Signals travelling along cable 10 are sensed by circuit 80 and directed to header receiver 149. When a header is received, the address portion is compared with the address of the transceiver to determine if the receiver is intended to receive data within receiver 44. If the receiver is addressed, then a signal is coupled on line 58 to the data receiver 44 and multiplexer 52. The receiver 44 is alerted and the multiplexer selects "N" from line 57 and couples it to register 51. The counter 50 then provides, for example, a 10 HHz signal and the ECL amplifier 45 then receives data at the rate at which it was transmitted. The operation of the circuit is substantially the same from this point on as that described in relation to the receiver of FIG. 5 and will not be repeated here. If the receiver is not addressed then header receiver 149 signals the data source 31 (See FIG. 4) via line 160 that cable 10 is not clear for use.

Assume further that a transmission through transmission lead 40 occurs. It will be apparent to one skilled in the art that the induced currents in lines 106 and 108 will cancel and the header receiver 149 will not detect any signal emanating from lead 40. A balanced bridge circuit is created, such that extrinsic signals travelling along the cable 10 will be detected even while a transmission through lead 40 occurs. Thus, the direction of any interfering signal can be determined by the polarity characteristics of the detected signal. The polarity of the signal is dependent on whether the interfering transmitter is to the left or right of the receiving transceiver. Therefore, if during a transmission, header receiver 149 detects a conflicting signal, the direction of the signal is determined by the polarity of sensing circuit 80. A left or right hierarchy can thus be created such that a precedence order exists among cable users, as will be discussed more fully below.

Figure 9:
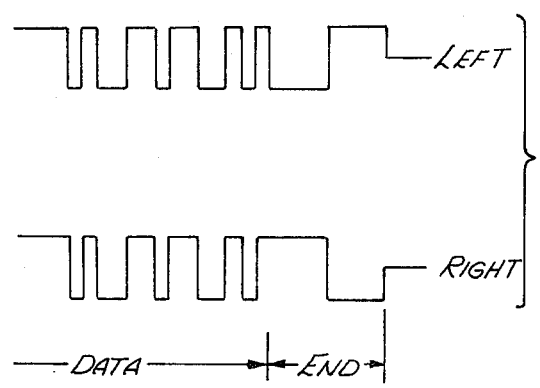
FIG. 9 illustrates end signals used in a digital message to denote a left or right priority for cable users.

Referring to FIG. 9, every transmitter circuit ends each data message with the previously discussed end signal whose data content determines left or right precedence. Header receiver 149 detects the presence and content of the end signal, and updates the internal precedence register if the precedence has been altered by a user. This updated precedence is then used in all future collision situations, until once again altered by a user. It will be appreciated that the precedence code need not be encoded within the end signal. For example, where a uniform data transmission rate is used by all transceivers coupled to the cable, the left or right priority could be contained within the initial alert signal transmitted at the beginning of each message. However, since in the presently preferred embodiment multiple data rates are employed to optimize cable use, the precedence is determined by the content of the end signal to avoid ambiguity.

Figure 10:
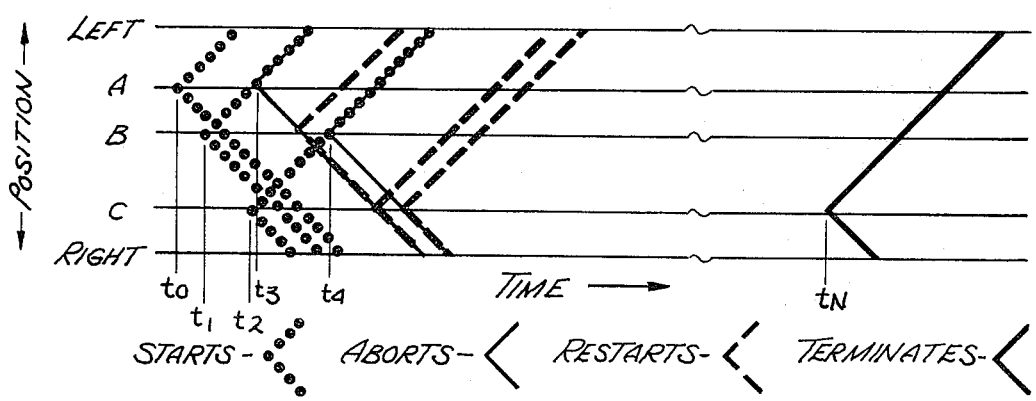
FIG. 10 is a graph illustrating the operation of a precedence to the right priority system which is disclosed.

FIG. 10 illustrates the present invention's operation where a precedence for signals coming from the right has been specified. Transceivers A, B and C are coupled to a common cable, with their relative positions to each other represented as either to the left or right. At $t_0$ transceiver A, not sensing any cable use, begins to transmit a data message including an alert and header. Before transmitter A's alert reaches transceiver B, B begins to transmit its own data at time $t_1$. At time $t_3$ B's message is sensed by A using the sensing circuit described in this patent, and A's header receiver 149 determines that transceiver B is to the right based on the signal polarity and thus has priority. A's receiver instructs A's data source 31 via control line 160 to abort the transmission and await the detection of an end signal. Included in every abort is the transmission of the aforementioned distinctive end signal, however, it must be recalled that the nature of the previously described sensing circuit is such that transceiver A cannot sense its own end signal.

Similarly, transceiver B, upon detecting A's colliding signal determines that A is to the left and signals its data source to retransmit its message upon receiving A's end signal at time $t_4$.

As shown in FIG. 10, before B's message reaches transceiver C, C has begun to transmit at time $t_2$. As in the previous case of transceivers A and B, upon sensing C's transmission B's header receiver determines that C is to the right thereby having priority instructs its data source to abort. Upon sensing B's abort via the distinctive end signal, C's header receiver initiates a restart and obtains control over the common cable, finally releasing control at time $t_n$ by transmitting an end signal.

In using the precedence system as disclosed above, in order to prevent ambiguities in operation, the minimum overall message length should be greater than one end to end and return cable propagation time. In addition, if all transceivers give precedence to transmission from the same direction, there will likely be multiple restarts, but the maximum time lost until one transmitter gains control of the cable will be one end to end and return transmission time plus the collision reaction time of the receiver circuit. It will also be appreciated that the priority characteristics can also be effected by controlling the delay in initiating a restart after recognition of an end signal.

Thus, an apparatus has been described for use on transceivers coupled to a common cable. The apparatus permits a transceiver to detect and determine the direction of colliding signals, even while transmitting and allows the creation of a hierarchy among the various users of the common cable to optimize cable use.

I claim:

1. In a receiver of the type used on a common cable data communication system, an improvement comprising:
    sensing means inductively coupled to said cable for detecting signals traveling along said cable;
    polarity detection means inductively coupled to said cable for determining the polarity of said signals detected by said sensing means;
    precedence control means coupled to said polarity detection means for determining the direction of said signals based on said polarity;
    whereby the presence and direction of signals traveling along a common cable is determined by said receiver.

2. In a data communications system where at least two transceivers each having a transmitter and receiver are spaced-apart along a common cable, an improvement comprising:
    sensing means inductively coupled to said cable for detecting signals travelling along said cable, said sensing means being coupled to said receiver of each transceiver;
    polarity detection means coupled to said sensing means for determining the polarity of said signals; and
    precedence control means coupled to said polarity detection means for determining the direction of said signals based on said polarity,
    whereby the presence and direction of signals travelling along a common cable is determined by each transceiver.

3. The improvement of claim 2 wherein said sensing means includes:
    first and second cores, spaced along said cable, an inner conductor of said cable passing through said cores;
    a transmitter lead coupled to said inner conductor of said cable at a point between said first and second cores, said transmitter lead being coupled to a transmitter of said transceiver.

4. The improvement of claim 3 wherein said sensing means further includes:
    a first winding wrapped around said first core;
    a second winding wrapped around said second core;
    resistor means coupled to said windings;
    connecting means between said first and second windings such that said windings are connected in series.

5. The improvement defined by claim 2 further including message means within said transmitter of each transceiver for preparing predetermined messages including a precedence signal to be communicated to said cable.

6. The improvement defined by claim 5 wherein said transmitter includes means to selectively alter the data content of said precedence signal.

7. The improvement defined by claim 6 wherein said precedence control means includes collision detection means for identifying a colliding signal travelling on said cable which has been generated by another transceiver while said transmitter is transmitting a signal, and selectively terminating and retransmitting said signal in accordance with a hierarchy determined by the data content of said precedence signal.

8. The improvement defined by claim 7 further comprising:
multiple data rate receiving means coupled to said receiver of each transmitter for receiving data at a first rate and a plurality of other rates, said first rate permitting transmission of data between the furthest apart of said transceivers on said cable;
multiple data rate transmission means, coupled to said transmitter of each transceiver for enabling transmissions of data at said first rate and said plurality of other rates;
selection means coupled to said multiple data rate transmission means, for selecting said plurality of rates as a function of the bandwidth of said cable between a transmitting transceiver and a receiving transceiver.

9. The improvement defined by claim 8 wherein said messages identify one of said transceivers to which data is transmitted and one of said plurality of rates.

10. The improvement as defined by claim 9 wherein said message includes an initial alert signal transmitted by said multiple data rate transmission means at said first rate.

11. The improvement defined by claim 10 wherein said end signal is of shorter duration than said alert and is transmitted at the end of said message at said first rate.

12. The improvement defined by claim 11 wherein said end signal includes said precedence signal.

13. A transceiver of the type used on a common cable data communications system comprising:
a transmitter comprising:
data message generation means for generating a data message to be transmitted over said cable;
signal means coupled to said data message generation means for generating an alert and end signal to signal the beginning and end of said data message, to be transmitted at a data rate such that said signals can be received by all transceivers coupled to said cable, said end signal being of shorter duration than said alert;
priority means coupled to said signal means for selectively altering said end signal to denote a predetermined hierarchy among all transceivers coupled to said cable;
a receiver comprising:
sensing means inductively coupled to said cable for detecting signals travelling along said cable;
polarity detection means couple to said sensing means for determining the polarity of said signals detected by said sensing means;
precedence control logic means coupled to said polarity detection means for identifying the direction of interfering signals on said cable while said transceiver is transmitting and selectively terminating and retransmitting said data messages depending on the position of said transceiver on said cable, the direction of said interfering signal, and said end signal;
whereby said transceiver can detect the presence and direction of interfering signals and selectively retransmit said data message in accordance with a predetermined transceiver hierarchy.

14. The transceiver as defined by claim 13 wherein:
said transmitter includes multiple data rate transmission means for enabling the transmission of data at a plurality of rates;
said data messages are transmitted at a data rate determined as a function of the distance said message will travel on said cable; and
said receiver includes multiple data rate reception means for enabling the reception of data at a plurality of rates.

* * * * *